United States Patent [19]

Moriyama

[11] Patent Number: 4,616,272

[45] Date of Patent: Oct. 7, 1986

[54] DIGITAL SIGNAL REPRODUCING APPARATUS

[75] Inventor: Masaru Moriyama, Yamato, Japan

[73] Assignee: Victor Company of Japan, Ltd., Kanagawa, Japan

[21] Appl. No.: 710,862

[22] Filed: Mar. 12, 1985

[30] Foreign Application Priority Data

Mar. 16, 1984 [JP] Japan .................................. 59-50557

[51] Int. Cl.[4] .......................... G11B 5/09; G11B 15/12
[52] U.S. Cl. ...................................... 360/47; 360/53; 360/63
[58] Field of Search ................... 360/47, 53, 121, 113, 360/63

[56] References Cited

U.S. PATENT DOCUMENTS 3,769,465 10/1973 Wellbrock ............................. 360/63

Primary Examiner—Vincent P. Canney
Attorney, Agent, or Firm—Ladas & Parry

[57] ABSTRACT

A digital signal reproducing apparatus comprises a reproducing head for reproducing from a magnetic tape digital signals which are magnetically recorded on n tracks of the magnetic tape, where n is a natural number greater than one, the magnetic tape has a guard band separating each of two adjacent tracks among the n tracks, the reproducing head comprises n reproducing element groups provided in correspondence with the n tracks and each of the n reproducing element groups comprises a plurality of reproducing elements arranged in the tape width direction over a range of a corresponding track and guard bands on both sides thereof, a selecting circuit for selectively obtaining outputs of those reproducing elements opposing a uniform part of the magnetic field intensity distribution of the corresponding track among outputs of the plurality of reproducing elements in each of the n reproducing element groups, which selecting circuit is provided for each of the n reproducing element groups, and an adder for adding outputs of the selecting circuit and for producing a reproduced signal from each of the n tracks.

5 Claims, 5 Drawing Figures

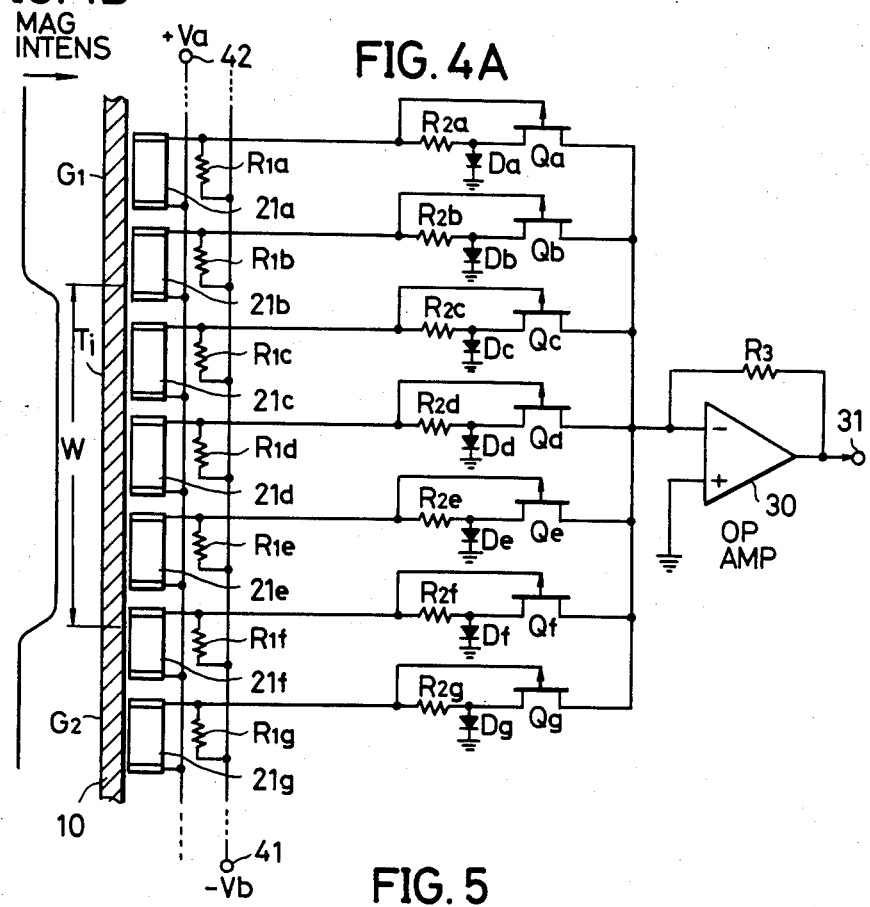
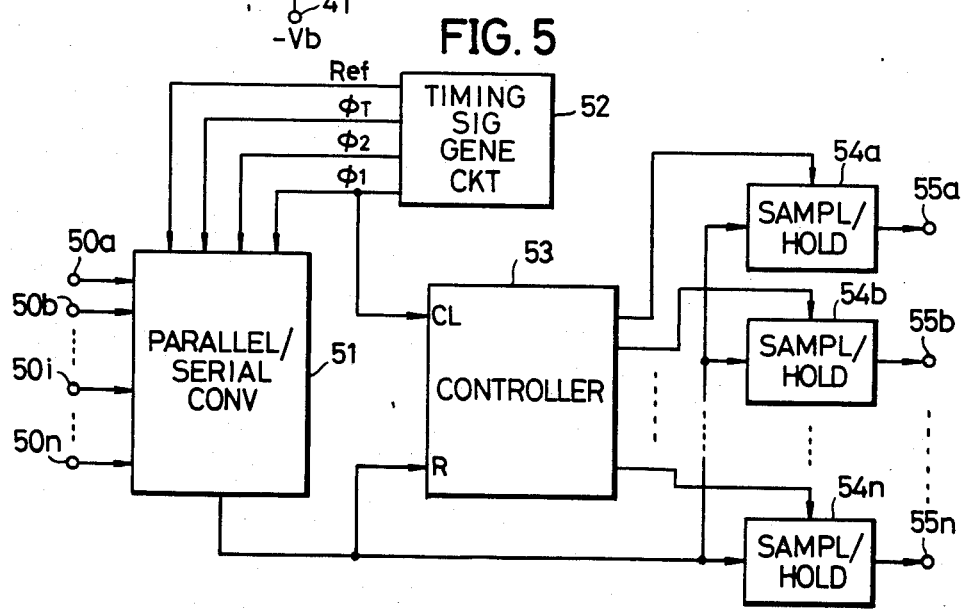

DIGITAL SIGNAL REPRODUCING APPARATUS

BACKGROUND OF THE INVENTION

The present invention generally relates to digital signal reproducing apparatuses, and more particularly to a digital signal reproducing apparatus which can satisfactorily reproduce digital signals recorded on a plurality of parallel tracks on a magnetic tape even when a relative positional difference exists in the track width direction between reproducing elements and a corresponding track.

Generally, when converting an audio signal into a digital signal and recording the digital signal on a magnetic tape by use of a stationary magnetic head, the total transmission rate in two channels is over 2 Mbits/sec when it is assumed that the audio signal converted into the digital signal by sampling the audio signal at a sampling frequency of over 44.1 kHz with 16 bits per channel. Hence, in order to stably record and reproduce such a digital signal, it is necessary to reduce the transmission rate per channel by increasing the number of tracks. For example, a compact type cassette tape is used as the magnetic tape and the number of tracks is selected to 20, and in a case where the recording is to be carried out in both forward and reverse directions, the track width of each of the tracks is selected to 65 $\mu$m and the width of a guard band between two adjacent tracks is selected to 15 $\mu$m.

The magnetic tape of the compact type cassette tape must be moved at a constant speed without deviations in the tape width direction, in order to reproduce signals from the plurality of pre-recorded tracks having the extremely small track width in the order of 65 $\mu$m. Thus, a reproducing apparatus which is designed to play this type of magnetic tape is generally provided with high-precision tape guides on both sides of recording and reproducing heads, and one edge of the magnetic tape is guided along flanges of the tape guides so that the magnetic tape makes contact with the recording and reproducing heads at predetermined positions. The tape guides compensates for the deviation of the magnetic tape in the tape width direction for each cassette tape. On the other hand, a dual capstan mechanism employing a pair of capstans is provided on the reproducing apparatus to control the tape moving speed, the tape tension and the state of contact between the head and the magnetic tape to become constant. However, the established standard for the tape width of the magnetic tape of the compact type cassette is in a range of 3.81 mm$-$50 $\mu$m to 3.81 mm$+$0. For this reason, the provision of the tape guides is insufficient to enable movement of the magnetic tape so that reproducing elements of the reproducing head accurately scan over corresponding tracks on the magnetic tape, which tracks have the extremely small track width in the order of 65 $\mu$m.

Accordingly, in the conventional reproducing apparatus, one of the plurality of tracks on the magnetic tape is used as a control track, and a pair of control heads are arranged side-by-side in the track width direction of the control track. In this case, the tracking error is detected from a difference in outputs of the pair of control heads. The position of the head is displaced under control responsive to the detected tracking error so that the reproducing elements of the reproducing head accurately scan over the corresponding tracks on the magnetic tape.

There is another conventional reproducing apparatus provided with a light sensor at positions corresponding to the edges of the magnetic tape. According to this other conventional reproducing apparatus, variations in the lights reflected from the magnetic tape are detected, and the tape guides are displaced under control responsive to the detected light variations so as to compensate for the deviation of the magnetic tape in the tape width direction.

However, the conventional reproducing apparatuses described heretofore require tracking control means for displacing the reproducing head or the magnetic tape so that the reproducing elements of the reproducing head accurately scan over the corresponding tracks on the magnetic tape. When such tracking control means is provided on the reproducing apparatus, it becomes necessary to provide a detector, an actuator and the like exclusively for the tracking control, and there are disadvantages in that the reproducing apparatus becomes bulky and the expensive. Further, there is a disadvantage in that the tracking control cannot be carried out with respect to a resonance of the rotating system, mechanical resonance and the like, because the mechanical response of the actuator is to slow to enable the head to accurately follow the deviation of the magnetic tape in the tape width direction introduced by causes such as the resonance of the rotating system and the mechanical resonance.

SUMMARY OF THE INVENTION

Accordingly, it is a general object of the present invention to provide a novel and useful digital signal reproducing apparatus in which the disadvantages described heretofore are overcome.

Another and more specific object of the present invention is to provide a digital signal reproducing apparatus in which a reproducing element group comprising a plurality of reproducing elements is provided with respect to each of a plurality of tracks on a magnetic tape, over a range exceeding the track width, where the adjacent tracks are separated by a guard band. Output signals of only the reproducing elements substantially opposing a corresponding track, among output signals of the plurality of reproducing elements of the reproducing element group, are used to obtain a reproduced signal from the track. According to the digital signal reproducing apparatus of the present invention, it is possible to constantly and satisfactorily reproduce digital signals from the tracks on the magnetic tape even when the moving magnetic tape deviates in the track width direction with respect to the reproducing elements. In addition, it is unnecessary to provide means for displacing the reproducing elements or the magnetic tape for carrying out the tracking control.

Still another object of the present invention is to provide a digital signal reproducing apparatus in which a plurality of reproduced signals obtained from the plurality of tracks on the magnetic tape are subjected to a parallel-to-serial conversion so as to obtain a serial reproduced signal.

Other objects and further features of the present invention will be apparent from the following detailed description when read in conjunction with the accompanying drawings.

BRIEF DESCRIPTION OF THE DRAWINGS

FIG. 4A is a system circuit diagram showing a second embodiment of the essential part of the digital signal reproducing apparatus according to the present invention;

FIG. 4B shows the magnetic field intensity distribution in the track width direction of one track on the magnetic tape in correspondence with a reproducing element group shown in FIG. 4A; and FIG. 5 is a system block diagram showing an embodiment of another essential part of the digital signal reproducing apparatus according to the present invention.

DETAILED DESCRIPTION

Figure 1:
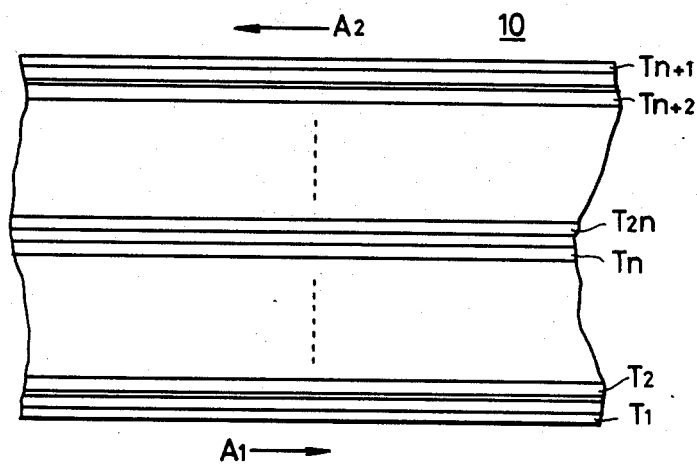
FIG. 1 shows an example of a track pattern formed on a magnetic tape recorded with digital signals which are to be reproduced on the digital signal reproducing apparatus according to the present invention.

An example of a track pattern formed on a magnetic tape recorded with digital signals which are to be reproduced on the digital signal reproducing apparatus according to the present invention, is shown in FIG. 1. Tracks $T_1$ through $T_{2n}$ extend in a longitudinal direction of a magnetic tape 10, and digital signals are recorded on the tracks $T_1$ through $T_{2n}$, where n is a natural number and is equal to 20, for example. The tracks $T_1$ through $T_n$ are formed while the magnetic tape 10 moves in an arrow direction $A_1$, and the tracks $T_{n+1}$ through $T_{2n}$ are formed while the magnetic tape 10 moves in an arrow direction $A_2$. Digital signals of audio signals which are converted into parallel signals, are simultaneously recorded on the n tracks ($T_1$ through $T_n$ or $T_{n+1}$ through $T_{2n}$) by n recording heads. A recording system for carrying out such a simultaneous recording of the n tracks is known, and a description thereof will be omitted in the present specification since the recording system is not closely related to the subject matter of the present invention.

Each of the tracks $T_1$ through $T_{2n}$ has a track width of 65 μm, for example, and a track pitch of 80 μm, for example. In other words, the adjacent tracks are separated by a guard band having a width of 15 μm, for example, which guard band is not recorded with a signal. The magnetic flux distribution is approximately uniform at the central part of each track in the track width direction, but decreases at both edges of each track. The magnetic flux at the edges of each track leaks to the guard bands adjacent thereto.

Figure 2B:
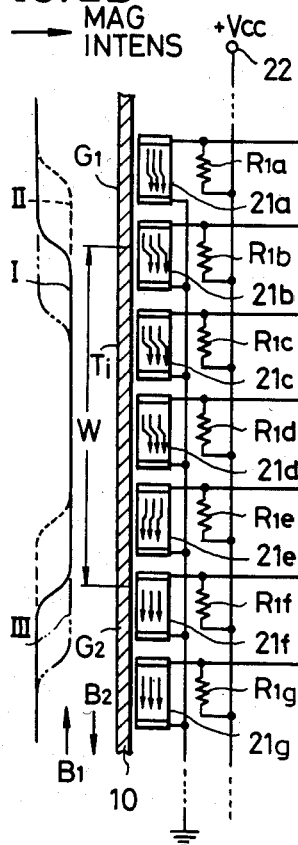
FIG. 2B shows the magnetic field intensity distribution in the track width direction of one track on a magnetic tape in correspondence with a reproducing element group shown in FIG. 2A.
Figure 2A:
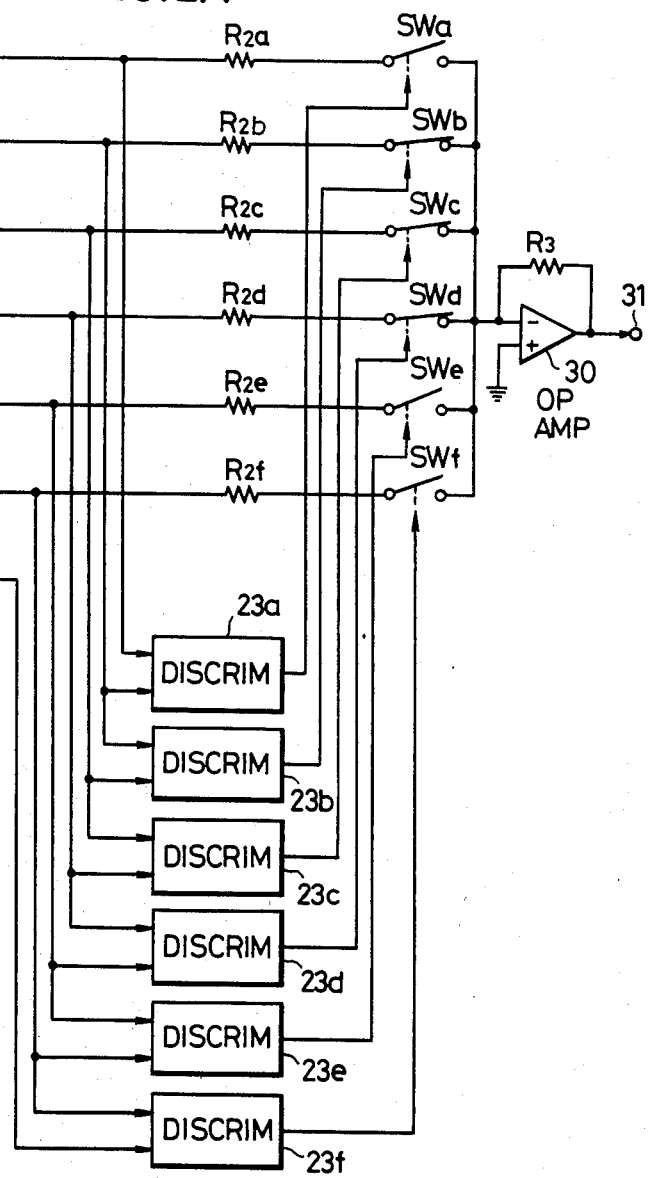
FIG. 2A is a system circuit diagram showing a first embodiment of an essential part of the digital signal reproducing apparatus according to the present invention.

A system circuit diagram of a first embodiment of an essential part of the digital signal reproducing apparatus according to the present invention is shown in FIG. 2A. In FIG. 2A, the magnetic tape 10 having the track pattern shown in FIG. 1 is illustrated in a cross section along the width direction thereof, and a part of the magnetic tape 10 including an arbitrary track $T_i$ and the guard bands on both sides of the arbitrary track $T_i$ is shown in an enlarged scale, where i is an arbitrary natural number from 1 to n. In FIG. 2A, the magnetic tape 10 moves vertically to the paper toward or away from the paper. The magnetic field intensity distribution in the track width direction is shown in FIG. 2B. The magnetic field intensity in a part of the arbitrary track $T_i$ indicated by a width W in FIG. 2B is uniform, but gradually decreases on both sides of the width W. The magnetic field intensity is equal to zero in guard band parts indicated by $G_1$ and $G_2$ in FIG. 2B. FIG. 2B shows the magnetic field intensity distribution for a case where the signal recorded in the cross sectional part of the arbitrary track $T_i$ represents a signal level "1". Further, a solid line I in FIG. 2B indicates the magnetic field intensity distribution for a case where the magnetic tape 10 is positioned in an approximate regular position with respect to reproducing elements which will be described later on in the specification, and a phantom line II and a one-dot chain line III in FIG. 2B indicate the magnetic field intensity distributions for cases where the magnetic tape 10 is relatively deviated in the tape width direction with respect to the reproducing elements.

Magneto-resist elements (hereinafter simply referred to as MR elements) $21a$ through $21g$ are provided in correspondence with the arbitrary track $T_i$ on the magnetic tape 10, as the reproducing elements. The MR elements $21a$ through $21g$ constitute an MR element group. n of such MR element groups each comprising a plurality of MR elements (seven MR elements in the case of the present embodiment) are provided with respect to the corresponding n tracks $T_1$ through $T_n$ (or $T_{n+1}$ through $T_{2n}$). The n MR element groups are arranged in a line along the tape width direction. As is well known, the MR elements are minutely formed on a substrate in the form of a thin film by an MR material.

The MR elements $21a$ through $21g$ have one end thereof commonly connected to ground. The other ends of the MR elements $21a$ through $21g$ are coupled to a terminal 22 which is applied with a power source voltage $+V_{cc}$, through respective resistors $R_{1a}$ through $R_{1g}$ which have the same resistance and function as constant current sources. The other end of the MR element $21a$ is connected to a discriminator $23a$ and is also coupled to one terminal of a switch $SW_a$ through a resistor $R_{2a}$ for mixing. The other end of the MR element $21b$ is connected to discriminators $23b$ and $23c$ and is also coupled to one terminal of a switch $SW_b$ through a resistor $R_{2b}$. Similarly, the other ends of the MR elements $21c$ through $21f$ are each connected to two adjacent discriminators among the discriminators $23b$ through $23f$ and each are also coupled to one terminal of a corresponding switch among switches $SW_c$ through $SW_f$ through a corresponding resistor among resistors $R_{2c}$ through $R_{2f}$. The other end of the MR element $21g$ is connected to the discriminator $23f$.

Figure 3:
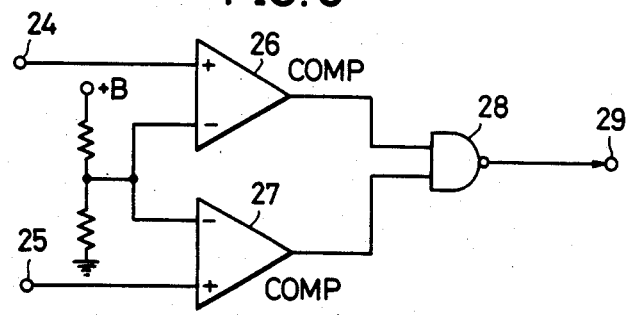
FIG. 3 is a circuit diagram showing an embodiment of a concrete circuit of a discriminator shown in FIG. 2A.

The discriminators $23a$ through $23f$ (23) have the construction shown in FIG. 3, for example. A voltage applied to a terminal 24 is supplied to a non-inverting input terminal of a comparator 26 and is compared with a reference voltage applied to an inverting input terminal of the comparator 26. A voltage applied to a terminal 25 is supplied to a non-inverting input terminal of a comparator 27 and is compared with the reference voltage applied to an inverting input terminal of the comparator 27. Output signals of the comparators 26 and 27 are supplied to a NAND gate 28, and an output signal of the NAND gate 28 is obtained through an output terminal 29 as a switching control signal.

Output switching control signals of the discriminators 23a through 23f are applied to respective switches $SW_a$ through $SW_f$. The switches $SW_a$ and $SW_f$ open responsive to a high-level switching control signal and close responsive to a low-level switching control signal. The other terminals of the switches $SW_a$ through $SW_f$ are commonly connected to an inverting input terminal of an operational amplifier 30. A non-inverting input terminal of the operational amplifier 30 is grounded. The output side of the operational amplifier 30 is coupled to the inverting input terminal thereof through a resistor $R_3$. The operational amplifier 30 constitutes an adder together with the resistor $R_3$ and the resistors $R_{2a}$ through $R_{2f}$ which have the same resistance.

In a case where the magnetic tape 10 assumes such a position that the magnetic field intensity distribution of the arbitrary track $T_i$ with respect to the MR elements 21a through 21g is as indicated by the solid line I in FIG. 2B, the MR elements 21a, 21f and 21g are unaffected by the magnetic field of the arbitrary track $T_i$. When it is assumed in this case that current paths within the MR elements 21a, 21f and 21g are approximately linear as indicated by arrows within the MR elements in FIG. 2A, the resistances of the MR elements 21a, 21f and 21g are small and output voltage levels of the MR elements 21a, 21f and 21g are lower than the reference voltages of the discriminators 23a through 23f. On the other hand, the MR elements 21b through 21e are affected by the magnetic field of the arbitrary track $T_i$ and current paths within the MR elements 21b through 21e curve as indicated by arrows within the MR elements in FIG. 2A. Hence, the resistances of the MR elements 21b through 21e become large and output voltage levels of the MR elements 21b through 21e become higher than the reference voltages of the discriminators 23a through 23f. Accordingly, the discriminators 23a, 23e and 23f each produce a high-level switching control signal, and the discriminators 23b through 23d each produce a low-level signal. As a result, the switches $SW_a$, $SW_e$ and $SW_f$ open and the switches $SW_b$ through $SW_d$ remain closed. For this reason, only the output voltages of the MR elements 21b through 21d are added and is obtained through the output terminal 31 as a reproduced signal from the abritrary track $T_i$. The discriminators 23a through 23f control the switches $SW_a$ through $SW_f$ so as to block the output voltages of those MR elements among the MR elements 21a through 21g opposing the guard bands $G_1$ and $G_2$ on both sides of the arbitrary track $T_i$ and opposing parts of the magnetic tapes 10 where the magnetic field intensity distribution is not uniform and is sloping, and add only the output voltages of those MR elements among the MR elements 21a through 21g opposing the arbitrary track $T_i$ where the magnetic field intensity distribution is uniform.

It will now be assumed that the moving magnetic tape 10 deviates in a tape width direction $B_1$ and the magnetic field intensity distribution of the arbitrary track $T_i$ becomes as indicated by the phantom line II in FIG. 2B. In this case, only the output voltage levels of the MR elements 21a through 21d become higher than the reference voltages of the discriminators 23a through 23f. As a result, the discriminators 23a through 23c each produce a low-level switching control signal and the discriminators 23d through 23f each produce a high-level switching control signal. Consequently, the switches $SW_a$ through $SW_c$ close and the switches $SW_d$ through $SW_f$ open. Therefore, only the output voltages of the MR elements 21a through 21c which correspond to a part of the deviated arbitrary track $T_i$ having the uniform magnetic field intensity distribution, are added and obtained through the output terminal 31 as the reproduced signal from the arbitrary track $T_i$.

On the other hand, the magnetic tape 10 may deviate in a tape width direction $B_2$, and in this case, the magnetic field intensity distribution of the abritrary track $T_i$ becomes as indicated by the one-dot chain line III in FIG. 2B. In this case, only the output voltage levels of the MR elements 21c through 21f become higher than the reference voltages of the discriminators 23a through 23f. As a result, the discriminators 23c through 23e each produce a low-level switching control signal and the discriminators 23a, 23b and 23f each produce a high-level switching control signal. Consequently, the switches $SW_c$ through $SW_e$ close and the switches $SW_a$, $SW_b$ and $SW_f$ open. Accordingly, only the output voltages of the MR elements 21c through 21e which correspond to a part of the deviated arbitrary track $T_i$ having the uniform magnetic field intensity distribution, are added and obtained through the output terminal 31 as the reproduced signal from the arbitrary track $T_i$.

A plurality of MR elements, discriminators, switches and an adder are provided with respect to each of the tracks $T_1$ through $T_n$ other than the arbitrary track $T_i$, similarly as in the case shown in FIG. 2A, and a reproduced signal from a uniform part of the magnetic field intensity distribution of each track is obtained from a corresponding operational amplifier (adder).

The switching of the switches $SW_a$ through $SW_f$ are controlled electronically by the output switching control signals of the discriminators 23a through 23f, and only the output voltages of the MR elements corresponding to the uniform part of the magnetic field intensity distribution of the arbitrary track $T_i$ are added so as to obtain the reproduced signal from the arbitrary track $T_i$. For this reason, there is no need to carry out a track control operation as in the conventional reproducing apparatus by detecting the tracking error and compensating for the detected tracking error by displacing the head or the magnetic tape. Conventionally, a high-precision tape guide or tracking control mechanism is used so as to minimize the delay from the time when the tracking error is detected and the time when the head or the magnetic tape is displaced to compensate for the detected tracking error. However, it is unnecessary to use such a high-precision tape guide or tracking control mechanism in the digital signal reproducing apparatus according to the present invention. In addition, since the present invention does not require mechanical aids to satisfactorily reproduce the digital signals from the tracks on the magnetic tape, the entire circuit shown in FIG. 2A can be manufactured in the form of an integrated circuit. Moreover, the MR elements 21a through 21g and the like can be formed with a high precision by methods such as vapor deposition and sputtering, and the resolution at the time of the reproduction in the track width direction can be improved. As a result, it is possible to reduce both the overall size and manufacturing cost of the digital signal reproducing apparatus.

A second embodiment of the essential part of the digital signal reproducing apparatus according to the present invetion is shown in FIG. 4A. In FIG. 4A, those parts which are the same as those corresponding parts in FIG. 2A are designated by the same reference numerals, and their description will be omitted. The magnetic field intensity distribution of the track in FIG. 4B is shown similarly as in FIG. 2B. In FIG. 4A, one end of each of the MR elements 21a through 21g is coupled to a terminal 41 of a power source voltage −Vb, through a corresponding resistor among the resistors $R_{1a}$ through $R_{1g}$. The other end of each of the MR elements 21a through 21g is connected to a common terminal 42 of a power source voltage +Va. The one end of each of the MR elements 21a through 21g is connected to a gate of a corresponding P-channel field effect transistor (FET) among the P-channel FETs $Q_a$ through $Q_g$, and is coupled to a drain of the corresponding FET among the FETs $Q_a$ through $Q_g$ through a corresponding resistor among the resistors $R_{2a}$ through $R_{2g}$. The drain of each of the FETs $Q_a$ through $Q_g$ is grounded through a corresponding diode among diodes $D_a$ through $D_g$ for preventing an erroneous operation due to an excessively large input to the FET. Sources of the FETs $Q_a$ through $Q_g$ are commonly connected to the inverting input terminal of the operational amplifier 30 which constitutes an adder.

The resistance of the resistors $R_{1a}$ through $R_{1g}$ is selected to $R_1$ which is sufficiently larger than the resistance of the MR elements 21a through 21g. A bias current described by $(Va+Vb)/R_1$ flows through each of the MR elements 21a through 21g. The output voltage of each of the MR elements 21a through 21g under no magnetic field is set to a voltage (high level) higher than the pinch-off voltage +Vp of the FETs $Q_a$ through $Q_g$.

Accordingly, in a state where the magnetic field intensity distribution of the arbitrary track $T_i$ is as indicated by a solid line in FIG. 4B, the MR elements 21a, 21b, 21f and 21g each produce a high-level voltage and the FETs $Q_a$, $Q_b$, $Q_f$ and $Q_g$ are OFF. In addition, the magnetic field of the arbitrary track $T_i$ acts on the MR elements 21c through 21e and the internal resistances of the MR elements 21c through 21e increase. As a result, the output voltage of each of the MR elements 21c through 21e falls below zero voltage (assumes a low level) and the FETs $Q_c$ through $Q_e$ are turned ON. For this reason, the output voltages of the MR elements 21c through 21e corresponding to the approximate center part of the arbitrary track $T_i$ are supplied to the operational amplifier 30 through the respective FETs $Q_c$ through $Q_e$ and added. The output signal of the operational amplifier 30 is obtained through the output terminal 31 as the reproduced signal from the arbitrary track $T_i$.

According to the circuit shown in FIG. 4A, it is unnecessary to provide the discriminators 23a through 23f as in the case of the circuit shown in FIG. 2A, and the circuit construction is simplified.

A system block diagram of an embodiment of a circuit for processing the reproduced signal obtained through the terminal 31 shown in FIGS. 2A and 4A, is shown in FIG. 5. As described before, the circuit shown in FIG. 2A or 4A is provided with respect to each of the n tracks $T_1$ through $T_n$ (or $T_{n+1}$ through $T_{2n}$) on the magnetic tape 10, that is, n such circuits are provided. The reproduced signals from the n tracks are obtained from the n circuits and are applied independently to respective input terminals 50a through 50n shown in FIG. 5. Hence, the reproduced signal from the arbitrary track $T_i$ is obtained through the output terminal 31 and is applied to the input terminal 50i. The reproduced signals applied to the input terminals 50a through 50n are supplied to a parallel-to-serial (parallel/serial) converter 51. For example, in a case where n=20 and 20 tracks are provided on the magnetic tape 10, the parallel/serial converter 51 is constituted by a 20-stage charge transfer device comprising charge transfer elements, such as a 20-stage bucket brigade device (BBD) which operates with two clock signals having mutually different phases. In addition to the reproduced signals, the parallel/serial converter 51 is supplied with a reference signal Ref, a transfer signal $\phi_T$ and clock signals $\phi_1$ and $\phi_2$ which are generated by a timing signal generating circuit 52.

For example, the parallel/serial converter 51 is supplied with the reference signal Ref for every 12 periods (hereinafter simply referred to as 12 clock periods) of the clock signal $\phi_1$, and the reference signal Ref is successively transferred to each stage of the parallel/serial converter 51 responsive to the clock signals $\phi_1$ and $\phi_2$. The level of the reference signal Ref is greater than the maximum level of the reproduced signal. At the eleventh clock period when the reference signal Ref is produced from the parallel/serial converter 51, the transfer signal $\phi_T$ is supplied to the parallel/serial converter 51 from the timing signal generating circuit 52, and the reproduced signals applied to the input terminals 50a through 50n are transferred in parallel to each stage of the parallel/serial converter 51. The reproduced signals from the tracks $T_1$ through $T_n$ (or $T_{n+1}$ through $T_{2n}$) and stored in each of the stages of the parallel/serial converter 51, are transferred to respective subsequent stages of the parallel/serial converter 51 responsive to the clock signals $\phi_1$ and $\phi_2$. Thus, the parallel/serial converter 51 produces in sequence the reference signal Ref, the reproduced signal from the track $T_n$ (or $T_{2n}$), the reproduced signal from the track $T_{n-1}$ (or $T_{2n-1}$), and so on. A serial reproduced signal produced from the parallel/serial converter 51 is supplied to a reset terminal R of a controller 53 and to sample and hold circuits 54a through 54n.

The clock signal $\phi_1$ from the timing signal generating circuit 52 is applied to a clock terminal CL of the controller 53. The threshold level at the reset terminal R of the controller 53 is greater than the maximum level of the reproduced signal. The counted value in the controller 53 is reset to zero when applied with the reference signal Ref included within the serial reproduced signal applied thereto. After the counted value is reset, the controller 53 increments the counted value by one for every one-half period of the clock signal $\phi_1$. When the counted value in the controller 53 is equal to "1" when the reproduced signal from the track $T_n$ (or $T_{2n}$) is produced from the parallel/serial converter 51, the controller 53 supplies a control signal to only the sample and hold circuit 54n. When the counted value in the controller 53 is equal to "2", the controller 53 supplies a control signal to only the sample and hold circuit $54_{n-1}$ (not shown) for the reproduced signal from the track $T_{n-1}$ (or $T_{2n-1}$).

Accordingly, the controller 53 supplies a control signal and operates one of the sample and hold circuits 54a through 54n depending on the counted value in the controller 53. When the counted value in the controller 53 is equal to "20", only the sample and hold circuit 54a is operated. Hence, the sample and hold circuit 54a samples and holds the reproduced signal from the track $T_1$ (or $T_{n+1}$) and produces the sampled and held signal through a terminal 55a. Similarly, the sample and hold circuits 54b through 54n each sample and hold the reproduced signal from the corresponding track among the tracks $T_2$ through $T_n$ (or $T_{n+2}$ through $T_{2n}$) and produce the sampled and held signal through a corresponding terminal among terminals 55b through 55n. It is possible to subject the output serial reproduced signal of the parallel/serial converter 51 to an analog-to-digital conversion in an analog-to-digital converter, and digitally separate the reproduced signal from each track to produce the parallel output.

It is possible to greatly reduce the wiring by subjecting the reproduced signals from the tracks $T_1$ through $T_n$ to the parallel/serial conversion and serially transmitting the reproduced signal.

For example, a parallel/serial converter R5101 manufactured by Reticon Corporation of the United States may be used for the parallel/serial converter 51. It is possible to use one parallel/serial converter R5101 or use two parallel/serial converters R5101 coupled in series. The controller 53 may be constituted by a combination of a TTL counter Ser. No. 74LS163 and a decoder Ser. No. 74LS154 manufactured by Texas Instruments of the United States, for example.

It is possible to use elements other than the MR elements for the reproducing elements of the head. For example, Si Hall elements, MOS Hall elements and magnetic transistors may be used for the reproducing elements of the head. It is also possible to use bipolar transistors, diodes and the like instead of the FETs $Q_a$ through $Q_g$. The adder constituted by the operational amplifier 30 and the like may be omitted in the circuit so as to simply produce the current through the terminal 31. In the embodiment shown in FIG. 4A, the signal which is obtained through the terminal 31 and is inverted, will have the same polarity as the signal obtained through the terminal 31 in the embodiment shown in FIG. 2A.

When the MOS Hall elements are used for the reproducing elements of the head in the circuit shown in FIG. 4A and a MOS BBD is used for the parallel/serial converter 51 shown in FIG. 5 which is supplied with the reproduced signals, it is possible to incorporate the circuits shown in FIGS. 4A and 5 into a single integrated circuit. Other charge transfer elements such as a charge coupled device (CCD) may be used instead of the BBD.

Further, the present invention is not limited to these embodiments, but various variations and modifications may be made without departing from the scope of the present invention.

What is claimed is:

1. A digital signal reproducing apparatus comprising:
    reproducing element means for reproducing from a magnetic tape digital signals which are magnetically recorded on n tracks of the magnetic tape, where n is a natural number greater than one, said magnetic tape having a guard band separating each of two adjacent tracks among the n tracks, said reproducing element means comprising n reproducing element groups provided in corrspondence with the n tracks, each of said n reproducing element groups comprising a plurality of reproducing elements arranged in the tape width direction over a range of a corresponding track and guard bands on both sides thereof;
    selecting means for selectively obtaining outputs of those reproducing elements opposing a uniform part of the magnetic field intensity distribution of said corresponding track among outputs of the plurality of reproducing elements in each of said n reproducing element groups, said selecting means being provided for each of said n reproducing element groups;
    adding means for adding outputs of said selecting means and for producing a reproduced signal from each of said n tracks;
    a parallel-to-serial converter for subjecting the output signal of each of said adding means obtained for each of said n tracks to parallel-to-serial conversion;
    a plurality of sample and hold circuits supplied with an output signal of said parallel-to-serial converter;
    a timing signal generating circuit for supplying clock signals, a reference signal and a transfer signal to said parallel-to-serial converter; and
    a controller having a clock terminal applied with an output clock signal of said timing signal generating circuit and a reset terminal applied with the output signal of said parallel-to-serial converter for successively supplying a sample and hold signal to each of said sample and hold circuits.

2. A digital signal reproducing apparatus as claimed in claim 1 in which each of said plurality of reproducing elements in each of said n reproducing element groups is constituted by a magneto-resist element.

3. A digital signal reproducing apparatus as claimed in claim 1 in which said selecting means comprises a plurality of switching elements coupled to the reproducing elements of each of said n reproducing element groups for selectively passing and blocking outputs of the reproducing elements, and a plurality of discriminators coupled to said switching elements for discriminating the existence of an output of each of the reproducing elements and for applying control signals to said switching elements and for controlling said switching elements so as to selectively pass output signals of those reproducing elements having an output.

4. A digital signal reproducing apparatus as claimed in claim 3 in which each of said discriminators is supplied with the output signals of adjacent reproducing elements and controls the switching of each of said switching elements so as to selectively pass the output signal of a corresponding reproducing element when the adjacent reproducing elements each have an output.

5. A digital signal reproducing apparatus as claimed in claim 1 in which said selecting means comprises a plurality of field effect transistors having gates thereof directly connected to the respective reproducing elements and having drains thereof coupled to the respective reproducing elements through respective resistor elements.

* * * * *